(12) United States Patent
Hara

(10) Patent No.: US 6,801,120 B2
(45) Date of Patent: Oct. 5, 2004

(54) CONTROL APPARATUS

(75) Inventor: Kentaro Hara, Kyoto (JP)

(73) Assignee: Omron Corporation, Kyoto (JP)

( * ) Notice: Subject to any disclaimer, the term of this patent is extended or adjusted under 35 U.S.C. 154(b) by 426 days.

(21) Appl. No.: 09/788,518

(22) Filed: Feb. 21, 2001

(65) Prior Publication Data

US 2003/0058086 A1 Mar. 27, 2003

(30) Foreign Application Priority Data

Feb. 21, 2000 (JP) .................................... 2000-042117

(51) Int. Cl.[7] .............................. H04B 1/00; H01Q 1/32
(52) U.S. Cl. ...................................... 340/5.72; 343/713
(58) Field of Search ............................... 340/5.72, 5.1, 340/5.3, 10.1, 10.2, 10.3, 10.33, 5.2, 5.62, 825.69, 825.72, 5.61, 5.64; 343/713, 742; 280/735

(56) References Cited

U.S. PATENT DOCUMENTS

| 5,334,969 A | 8/1994 | Abe et al. |
| 5,638,044 A | 6/1997 | Chua |
| 5,973,611 A | * 10/1999 | Kulha et al. ............... 340/5.62 |
| 6,095,553 A | * 8/2000 | Chou et al. .................. 280/735 |
| 6,218,929 B1 | * 4/2001 | Furuta et al. ................ 340/5.2 |
| 6,392,607 B1 | * 5/2002 | Gold et al. .................. 343/713 |

FOREIGN PATENT DOCUMENTS

| DE | 197 07 399 A1 | 8/1998 |
| EP | 0 521 547 A1 | 1/1993 |
| EP | 0 735 219 A2 | 10/1996 |
| JP | 9-310548 | 12/1997 |
| JP | 10-53071 | 2/1998 |
| WO | WO 99/23716 A1 | 5/1999 |

OTHER PUBLICATIONS

Patent Abstracts of Japan, JP 08 037411 A, (Kenwood Corp.), Feb. 6, 1996.

* cited by examiner

Primary Examiner—Michael Horabik
Assistant Examiner—William Bangachon
(74) Attorney, Agent, or Firm—Foley & Lardner LLP

(57) ABSTRACT

Antennas 22 to 25 of a main unit machine 20 are implemented as coil antennas and the coil antennas are disposed in parallel with the floor of a vehicle so that the axis of each coil antenna becomes perpendicular to the floor. Particularly, the in-vehicle antennas 24 and 25 are placed at the front and the rear near the center in the floor direction of the vehicle.

10 Claims, 10 Drawing Sheets

IN-VEHICLE ANTENNA INSTALLED IN PARALLEL WITH FLOOR

AREA IN WHICH MAIN UNIT MACHINE AND PORTABLE MACHINE CAN COMMUNICATE WITH EACH OTHER

IN-VEHICLE ANTENNA INSTALLED IN PARALLEL WITH FLOOR

AREA IN WHICH MAIN UNIT MACHINE AND PORTABLE MACHINE CAN COMMUNICATE WITH EACH OTHER

☐ IN-VEHICLE ANTENNA INSTALLED PERPENDICULARLY TO FLOOR

▨ AREA IN WHICH MAIN UNIT MACHINE AND PORTABLE MACHINE CAN COMMUNICATE WITH EACH OTHER

CONTROL APPARATUS

BACKGROUND OF THE INVENTION

1. Field of the Invention

This invention relates to a control apparatus, such as an entry system of a vehicle, for checking an authentication code for validity (so-called ID authentication), etc., for example, based on radio communications between a portable machine and a main unit machine, and for controlling machines, units, systems, etc., installed in the vehicle without requiring cumbersome operation of the operator.

2. Description of the Related Art

As a system containing this kind of control apparatus, for example, a keyless entry system of a vehicle coming into wide spread use in recent years has been available. This keyless entry system comprises a portable machine that can be carried by the user and a main unit machine (in this case, vehicle-installed machine) installed in a controlled object (in this case, vehicle). In keyless entry system, authentication code is checked for validity by radio communications between them and predetermined operation (unlocking or locking operation) of the controlled object (in this case, vehicle door locking) is accomplished under the control of the main unit machine provided that the authentication code is valid.

An early-type and general system of such a system has a configuration wherein the user operates a specific button, etc., placed on a portable machine, thereby radio-transmitting a specific operation signal containing an authentication code (for example, vehicle door unlocking command) from the portable machine, and a main unit machine receives the signal and checks that the authentication code contained in the received signal corresponds to the authentication code preset in the main unit machine, then performs predetermined output for controlling a predetermined controlled object (for example, control signal output for unlocking vehicle doors). Namely, the system provides a one-way communication system of conducting only one-way communications from the portable machine (in this case, transmitter) to the main unit machine (in this case, receiver)

However, in such a one-way communication system, the portable machine needs to be driven only with an installed battery, and it is impossible to output a signal containing the authentication code all the time because of consumption of the battery. Thus, as described above, a signal must always be transmitted with some operation of the user as a trigger (namely, it always becomes necessary for the user to perform some intentional operation); the system involves a limit to enhance the convenience of the user.

Then, in recent years, a more advanced system for conducting two-way communications containing electric power transmission between a portable machine and a main unit machine has been proposed and partially has been put to use. The system executes necessary check for validity while suppressing consumption of the power of the portable machine and then operating a controlled object.

For example, as a keyless entry system of a vehicle, a two-way communication system comes along, wherein a portable machine, which enters a communication-possible range, receives electric power transmission in non-contact from a main unit machine, thereby being started with the electric power transmission as a start signal, and transmits a signal containing an authentication code to the main unit machine while electric power required after the portable machine is started is also provided by the electric power transmission depending on the situation.

The two-way communication system makes it possible to automatically transmit the signal containing the authentication code to the main unit machine with the start caused by the power transmission as a trigger, so that predetermined operation of the controlled target can be accomplished without performing any operation of the user depending on the situation. For example, with an entry system of a vehicle, if the user carrying a portable machine simply approaches a door of a specific vehicle installing a main unit machine corresponding to the portable machine, the above-mentioned two-way communications can be established and an unlocking command can be automatically output to the lock of the locked door for automatically unlocking the vehicle doors. The more convenient entry system for enabling the vehicle doors to be unlocked or locked basically without requiring intentional operation of the user is called a smart entry system (or a hand-free entry system), etc., as a development model of a general keyless entry system. The market needs for such a smart entry system, etc., grow as an entry system enhancing the commodity product value of the vehicle installing the entry system.

By the way, antennas described in Japanese Patent Unexamined Publication No. Hei. 9-310548 and Japanese Patent Unexamined Publication No. Hei. 10-53071 have been known as an antenna of a main unit machine in such a system. That is, a rod antenna is built in a column part of a sun visor of an automobile or a room mirror attachment part for the purpose of maintaining a good directivity of the antenna.

However, the antennas of the main unit machines as described above involve the following problems:

It is difficult to provide a properly wide communication-possible range thoroughly (with no partial blind region) while transmission output is reduced to a minimum. Thus, there is a high possibility of occurrence of the following problem: Although the user carrying a portable machine lies in the same degree of the distance range from a vehicle (or exists in the vehicle), radio communications become impossible and predetermined control processing cannot be carried out depending on the existence position of the portable machine (particularly, position in the floor direction of the vehicle).

For example, advanced processing for determining where the portable machine exists based on whether or not radio communications are established cannot precisely be performed.

Particularly to put an advanced system such as the above-described smart entry system to use, the range in which radio communications (particularly, transmission and reception of power transmission as a start signal) are possible between the main unit machine and the portable machine (namely, the communication-possible range) needs to be set with good accuracy (or it may be preferred that the communication-possible range can be set with good accuracy). If a determination as to whether the portable machine (or the user carrying the portable machine) exists inside or outside a position a predetermined distance from the surroundings of the vehicle or whether or not the portable machine exists in the vehicle (namely, a portable machine search function of determining where the portable machine exists) can be accurately made based on whether or not radio communications are established, for example, the operation of automatically locking unlocked doors if the user carrying the portable machine simply leaves the vehicle a predetermined distance or more, the operation of enabling engine start if the user carrying the portable machine simply rides in the vehicle, or the like is made possible precisely without installing any separate expensive sensor, etc.

However, with the antennas in the related arts as described above, it would become difficult to, for example, set a communication-possible range for in-vehicle communications (particularly, transmission/reception-possible range of start signal) thoroughly in a sufficient wide range in the vehicle and set a communication-possible range for out-of-vehicle communications (particularly, transmission/reception-possible range of start signal) precisely in a predetermined range surrounding the vehicle (at least it would become difficult to set the range with one or several antennas). For example, as for the communication-possible range for in-vehicle communications, if only one antenna in the related art is placed in a vehicle, a communication-impossible region (blind region) of at least a start signal occurs in most portions in the vehicle. For example, if transmission output of the main unit machine is raised attempting to eliminate the blind regions, power consumption is increased and in addition, the communication-possible range is widened more than necessary at points where directivity is strong, and radio wave is output to the outside of the vehicle via a non-conductive portion (for example, window portion of vehicle), whereby the accuracy of the portable machine search function also worsens and the crime prevention of code theft is degraded because of radio wave leakage to the outside of the vehicle. If a plurality of antennas are placed at points in the vehicle for attempting to solve the problems, a large number of antennas become necessary, increasing the costs drastically.

According to the research of the inventor et. al, the reasons why it is hard to set a proper communication-possible range with the antennas in the related are as follows: First, the antennas attach importance to directivity. Second, as the antenna placement position, the antenna is built in a position easily affected by the vehicle body (metal portion) such as a column part of a sun visor or a room mirror attachment part as mentioned above.

SUMMARY OF THE INVENTION

It is therefore an object of the invention to provide a communication-type control apparatus for making it possible to solve problems concerning antennas as described above and set a proper communication-possible range while suppressing an increase in power consumption and apparatus costs, thereby more enhancing the reliability of control or the convenience of the user.

According to the invention, there is provided a control apparatus comprising:
- a portable machine that can be carried by the user; and
- a main unit machine being installed in a vehicle for executing control processing to accomplish predetermined operation of an object installed in the vehicle in response to the result of radio communications conducted with the portable machine. In the control apparatus, a radio communication antenna of the main unit machine is shaped like a coil and is placed so that an axial direction of the antenna becomes at right angle to a floor of the vehicle.

According to the invention, it is made possible to set the communication-possible range to an exceptionally wide, proper range (less blind regions as a whole) although the number of antennas, the antenna placement position, or the transmission output is the same as verified from the test results described later.

Thus, the possibility of occurrence of the problem wherein although the user carrying the portable machine lies in the same degree of the distance range from the vehicle (or exists in the vehicle), radio communications become impossible and the predetermined control processing is not executed depending on the position of the portable machine (particularly, position in the floor direction of the vehicle) can be decreased (namely, the operation reliability can be enhanced) without increasing power consumption or costs or involving the detrimental effects caused by unnecessary enlarging of the communication-possible range (the fear of having the authentication code contained in a radio signal stolen because the communication-possible range is unnecessarily spread or the like).

The term "vehicle" mentioned here includes an automobile, a small-sized airplane, etc., for example. The expression "object installed in the vehicle" can be a door lock, a drive source of an engine, a motor, etc., a drive mechanism of a transmission, etc., an air conditioner, an audio set, a navigation system, illumination, etc., for example.

The term "radio communications" mean communications using electromagnetic waves. The electromagnetic waves mentioned here also include infrared rays, etc., in addition to at least radio waves in the narrow sense.

The expression "executing control processing to accomplish predetermined operation of an object installed in the vehicle in response to the result of radio communications conducted" can be a mode of outputting a control signal for simply unlocking a door following a command transmitted in one way from the portable machine, for example, and a mode of checking the authentication code transmitted in one way from the portable machine for validity before outputting a control signal for unlocking a door following a command transmitted in one way from the portable machine. It can also be a mode in which a portable machine start signal is transmitted from the main unit machine, the portable machine started upon reception of the start signal returns an answer signal, and the main unit machine, which receives the answer signal, checks the authentication code contained in the answer signal for validity before outputting a control signal for unlocking a locked door.

The expression "floor of vehicle" means the floor of the cabin (living space) of the vehicle, and the expression "right angle to floor of vehicle" means a direction almost at right angle to the plane along the average plane direction of the whole floor (normally, plane parallel with the ground surface); a reasonable error from the strict right angle is contained as long as the communication-possible range can be set sufficiently wide and proper.

In a preferred form of the invention, as the radio communication antenna of the main unit machine, one or more in-vehicle communication antennas for conducting radio communications with the portable machine existing in the vehicle are placed near the center in a floor direction in the vehicle.

Such a composition makes it possible to set the communication-possible range with the portable machine in the vehicle to a wide range containing the corners in the vehicle while reducing transmission output to a minimum, and at most two in-vehicle communication antennas for the purpose may be placed.

Thus, the most of the above-described advantages of the invention can be made concerning radio communications made effective particularly when the portable machine exists in the vehicle. This means that it is made possible to enhance the reliability of the control operation based on radio communications made effective with the portable machine in the vehicle without increasing power consumption, costs, etc.

Preferably, the in-vehicle communication antenna is placed reasonably above the floor to decrease the effect from the floor of the vehicle.

In a preferred form of the invention, the main unit machine has a portable machine search function of determining where the portable machine exists depending on whether or not the radio communications with the portable machine are established.

Such a configuration makes it possible to precisely determine where the portable machine exists without the need for an additional sensor, and the portable machine search function important for an advanced system such as a smart entry system can also be realized with high reliability without increasing power consumption, costs, etc.

The portable machine search function can be provided by processing of a control circuit including a microcomputer contained in the main unit machine, for example.

In the control apparatus of the invention, the object installed in the vehicle may be a lock for locking or unlocking a door of the vehicle and the control processing may be control signal output for accomplishing the locking or unlocking operation of the lock.

In this case, the most of the above-described advantages of the invention (enhancement of the operation reliability, suppression of power consumption and costs, etc.,) can be made in a vehicle unlocking system (namely, entry system).

The main unit machine may have an in-vehicle communication antenna for conducting radio communications with the portable machine existing in the vehicle as the radio communication antenna and a portable machine search function of determining at least whether the portable machine exists inside or outside the vehicle depending on whether or not the communications with the portable machine through the in-vehicle communication antenna are established. The main unit machine may execute the control signal output for accomplishing the locking operation of the lock only if it is determined by the portable machine search function that the portable machine does not exist in the vehicle.

In such a configuration, if the portable machine or the user carrying it exists in the vehicle, the locking operation of the lock mentioned above (for example, automatic locking operation performed by the control apparatus, etc.,) is not executed, so that the portable machine or the user carrying it can be prevented from being locked into the vehicle with the above-described advantage of the invention. This means that the function of preventing the portable machine or the user carrying from being locked into the vehicle in the locking operation of the entry system can be realized with high reliability without increasing power consumption, costs, etc.

The main unit machine of the invention may have a portable machine search function of determining at least whether or not the portable machine is away from the vehicle exceeding a communication-possible range depending on whether or not the radio communications with the portable machine are established, wherein if it is determined by the portable machine search function that the portable machine is away from the vehicle exceeding the communication-possible range, the main unit machine may check that another necessary condition holds as required before executing the control signal output for accomplishing the locking operation of the lock.

In such a configuration, if the user carrying a predetermined portable machine gets off the vehicle and is away from the vehicle at a predetermined distance, the fact is determined by the portable machine search function and if another necessary condition holds, the locking operation of the lock of the vehicle is automatically executed. Therefore, the user can lock the doors of the vehicle simply by doing the natural action of getting off and being away from the vehicle without performing any intentional locking operation. Thus, the advantage of making it possible to accomplish the exit operation of a smart entry system can be produced with the above-described advantage of the invention. This means that the exit operation of the smart entry system can be realized with high reliability without increasing power consumption, costs, etc.

The expression "another necessary condition" can be, for example, that the lock be in an unlocked state or that the authentication code of the portable machine be determined valid by radio communications conducted before it is determined that the portable machine is away from the vehicle exceeding the communication-possible range.

The control processing may be signal output or data setting operation for enabling the operation of the object installed in the vehicle, or signal output for giving an instruction to operate the object installed in the vehicle.

In this case, a control system of the object installed in the vehicle by radio communications is provided and in such a system, the most of the above-described advantages of the invention (enhancement of the operation reliability, suppression of power consumption and costs, etc.,) can be made.

The expression "data setting operation for enabling the operation of the object installed in the vehicle" means internal processing of setting a flag for enabling the operation of the object installed in the vehicle in information processing of the main unit machine, for example.

The main unit machine of the invention may have an in-vehicle communication antenna for conducting radio communications with the portable machine existing in the vehicle as the radio communication antenna and a portable machine search function of determining at least whether the portable machine exists inside or outside the vehicle depending on whether or not the communications with the portable machine through the in-vehicle communication antenna are established, and the main unit machine may execute the signal output or data setting operation for enabling the operation of the object installed in the vehicle, or the signal output for giving an instruction to operate the object installed in the vehicle only if it is determined by the portable machine search function that the portable machine exists in the vehicle.

In such a configuration, if the portable machine or the user carrying it does not exist in the vehicle, the operation of the object installed in the vehicle is not enabled or an instruction to operate the object installed in the vehicle is not given. Thus, a problem of operating the object installed in the vehicle illegally or by mistake although the portable machine does not exist in the vehicle (for example, a problem of starting the engine of an unattended automobile and degrading safety of the surroundings) can be circumvented with the above-described advantage of the invention. This means that the function of preventing malfunction or illegal operation in the control system of the object installed in the vehicle by radio communications can be realized with high reliability without increasing power consumption, costs, etc.

DETAILED DESCRIPTION OF THE PREFERRED EMBODIMENT

Referring now to the accompanying drawings, there is shown a preferred embodiment of the invention.

Figure 2:
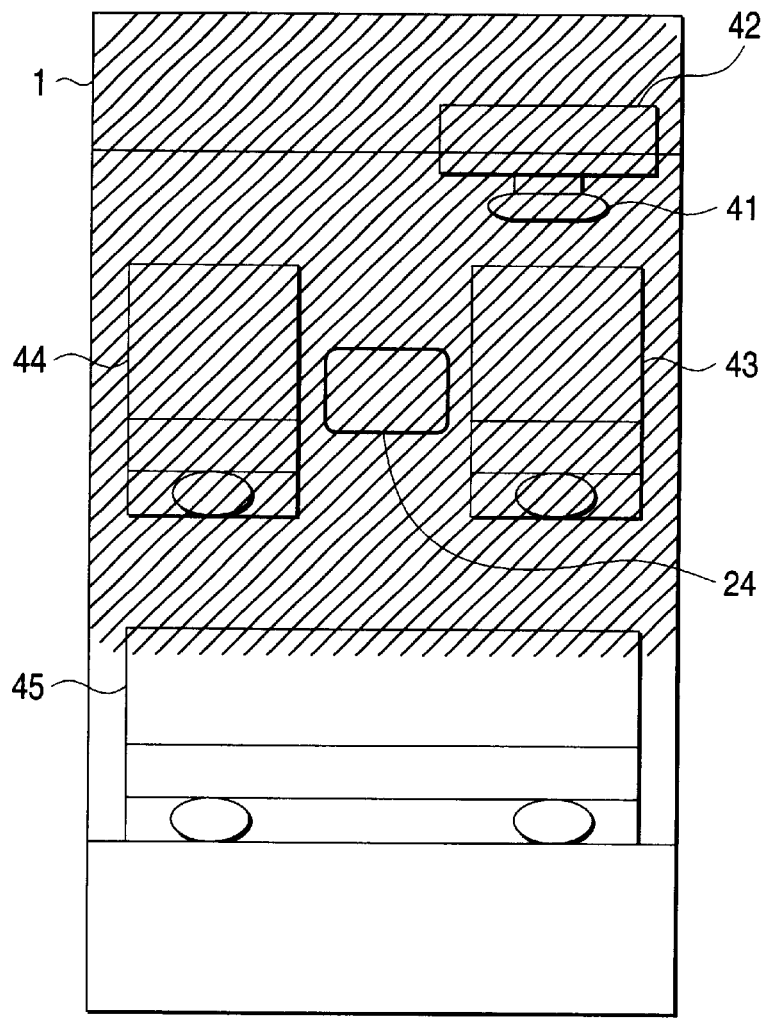
FIG. 2 is a drawing to show the spread of a communication-possible range in vehicle.
Figure 2:
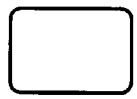
Figure 2:

The embodiment is an example of applying the invention to a control apparatus of an entry system and an engine start system of a vehicle 1 (shown in FIG. 2, etc.,).

Figure 1A:
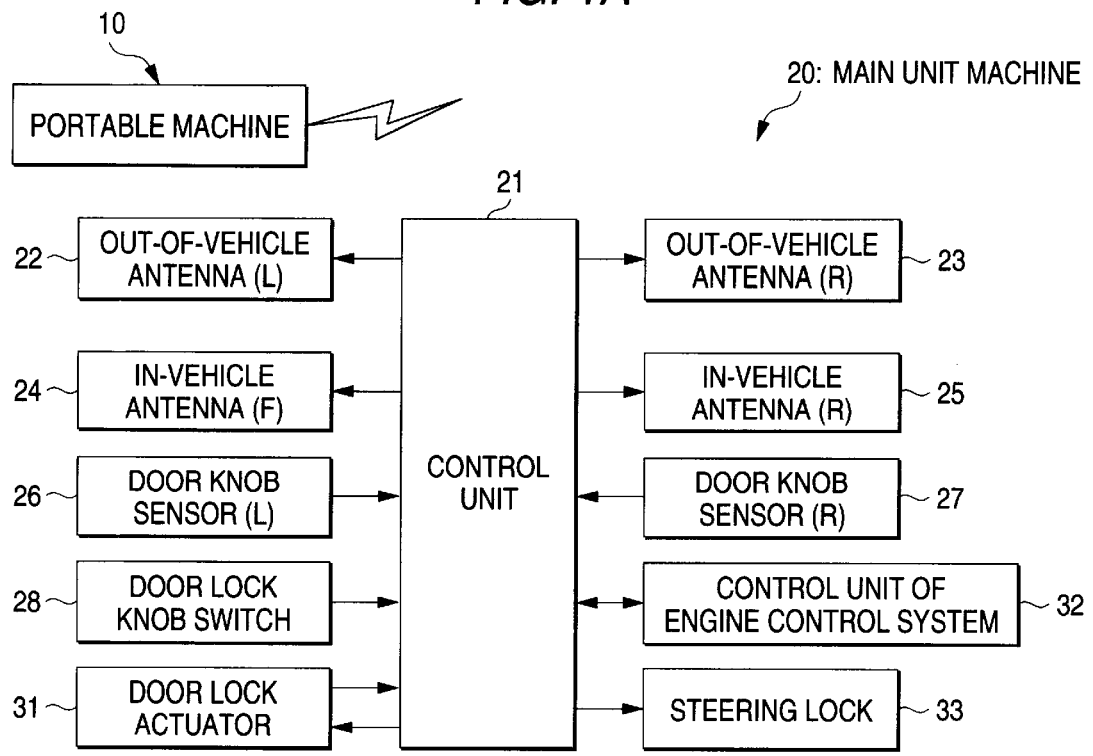
FIG. 1A is a drawing to show the general configuration of a control apparatus.

The control apparatus comprises a portable machine 10 and a main unit machine 20 (containing antennas and sensors as peripheral devices) installed in the vehicle 1, as shown in FIG. 1A.

The portable machine 10 contains power reception means (not shown), portable machine communication means (not shown), portable machine storage means (not shown), a control circuit (not shown), an internal battery, a power supply circuit (not shown) and the like. The power reception means receives electric power by non-contact power transmission of an electromagnetic wave. The portable machine communication means radio-communicates a signal at a communication frequency, such as a frequency in a UHF band, different from the frequency of the power transmission. The portable machine storage means stores at least an authentication code, also called ID code, key code, or the like. The control circuit contains a microcomputer for controlling the whole portable machine and performing necessary information processing. The power supply circuit supplies power of the internal battery and the power received by the power reception means to power consuming components, such as the portable machine communication means and the control circuit, and the like. A locking or unlocking switch (not shown), etc., of a push-button operation section maybe provided on the operation surface of the portable machine 10.

In FIG. 1A, numeral 31 denotes a door lock actuator of a drive source of a door lock of the vehicle 1, numeral 32 denotes a control unit of an engine control system of the vehicle 1, and numeral 33 denotes a steering lock of the vehicle 1.

The detailed configurations of the power reception means, the portable machine communication means, etc., are not limited in the invention and will not be discussed because at least various known configurations can be adopted. The main components are outlined. For example, the power reception means is made up of a coil antenna, a rectification circuit for generating DC power from an induced electromotive force produced on the coil antenna, and the like. For example, the portable machine communication means comprises the antenna common to the power reception means or a separate antenna, a circuit for radio-communicating at a predetermined communication frequency through the antenna (modulation circuit, demodulation circuit, originating circuit, etc.,), and the like. The control circuit comprises a CPU, ROM, RAM, and an input/output circuit. The portable machine storage means has erasable non-volatile memory storing an authentication code, such as EEPROM.

The power supply circuit has a circuit for performing necessary voltage conversion, voltage stabilization processing, etc. In this case, the power supply circuit comprises power supply control means (made up of switching elements, electromagnetic relays, semiconductor relays, etc.) for turning on and off power supply of the whole portable machine 10 (or main power supply). If the power supply control means turns off the power supply of the whole portable machine 10 according to a control command (sleep command) of the control circuit, a so-called sleet mode is entered in which the whole operation of the portable machine 10 is stopped and power consumption becomes zero or almost zero. If the power reception means receives predetermined electric power as a start signal in the sleep mode, the power supply control means is driven, power supply of the whole portable machine 10 (or main power supply) is turned on, and the portable machine 10 is started and remains started until another sleep command is output.

The control circuit has a function of executing the following processing operation according to operation program setting, etc., of the microcomputer:

When the control circuit is started by the above-mentioned start signal, it transmits a predetermined signal (start notification signal) as a response signal to the start signal for notifying that the control circuit is started and indicating the presence of the portable machine, as required.

The control circuit also has a function of radio-transmitting, by the portable machine communication means, an answer signal containing the authentication code previously registered in the portable machine storage means, provided that the portable machine communication means receives a request signal radio-transmitted from the main unit machine 20 during the starting. If the request signal contains an authentication code, the authentication code may be checked for validity in the portable machine 10 (namely, a check may be made to ensure that the authentication code contained in the request signal corresponds to the authentication code previously registered in the portable machine storage means before the answer signal is transmitted.

If the above-mentioned locking or unlocking switch is provided, the control circuit also has a function of radio-transmitting a locking command signal containing the authentication code or an unlocking command signal containing the authentication code when the switch is operated. When the locking command signal or the unlocking command signal is transmitted and is received at the main unit machine 20, the authentication code is checked for validity by the control function of the main unit machine 20 before the doors of the vehicle 1 are locked or unlocked. That is, the control apparatus of the embodiment made up of the portable machine 10 and the main unit machine 20 may be configured also to provide the same function as the control apparatus of a general keyless entry system (above-described one-way communication system).

On the other hand, the main unit machine 20 comprises a control unit 21, out-of-vehicle antennas 22 and 23, in-vehicle antennas 24 and 25, and sensors of door knob sensors 26 and 27, a door lock knob switch 28, etc., as shown in FIG. 1A.

Figure 1B:
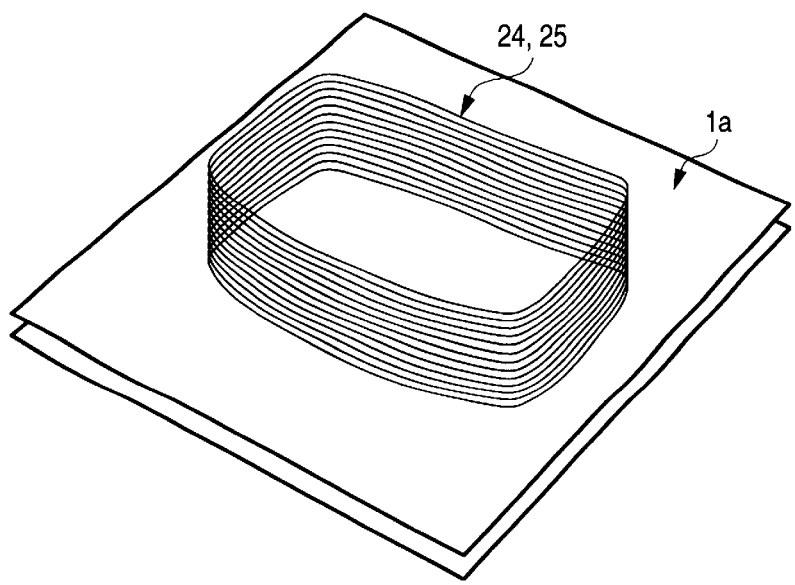
FIG. 1B is a drawing to show placement of an antenna.
Figure 3:
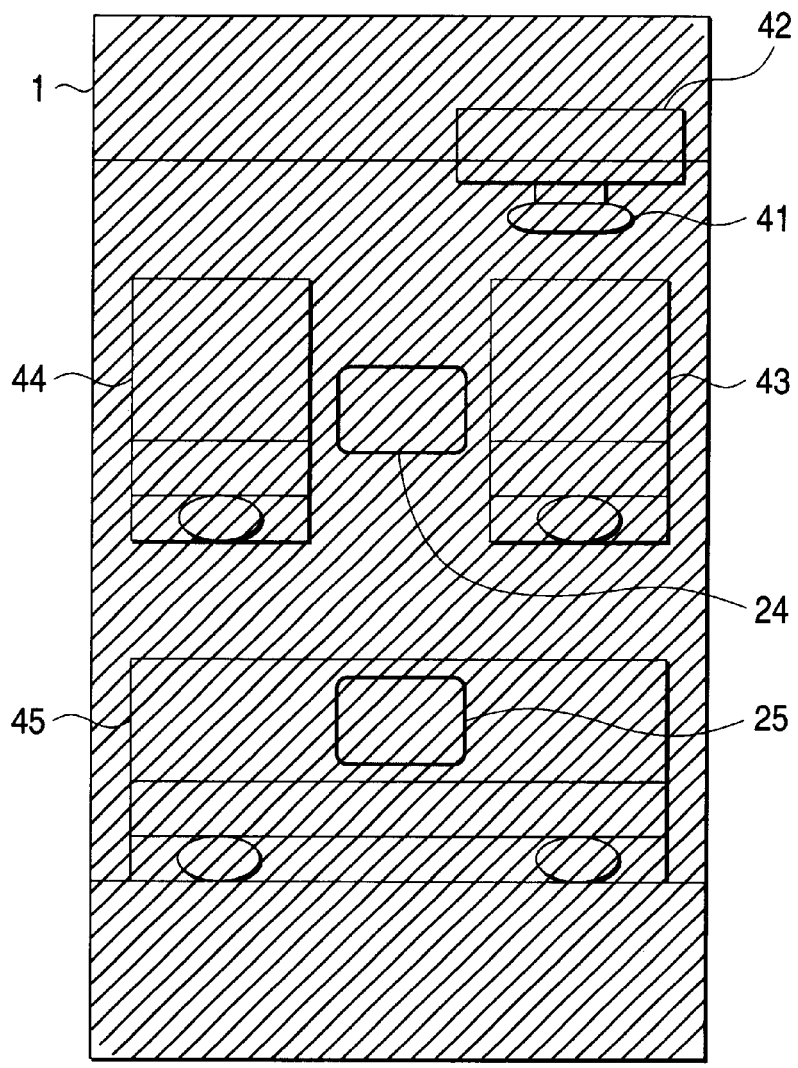
FIG. 3 is a drawing to show the spread of a communication-possible range in vehicle.
Figure 3:
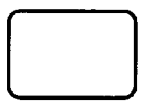
Figure 3:

The out-of-vehicle antennas 22 and 23 are coil antennas placed at the left and right of the outside of the vehicle 1 (for example, in door mirrors). The in-vehicle antennas 24 and 25 are coil antennas placed at front and rear positions near the center in the vehicle 1, as shown in FIG. 1B and FIG. 3. Since the user carrying the portable machine 10 usually sits in a driver's seat (or at least a passenger seat), only the front in-vehicle antenna 24 may be provided as the in-vehicle antenna, as shown in FIG. 2.

In FIG. 2 or FIG. 3, numeral 41 denotes a steering wheel, numeral 42 denotes an instrument panel, numeral 43 denotes a driver's seat, numeral 44 denotes a passenger seat, and numeral 45 denotes a rear seat.

The antennas 22 to 25 may be shared as antennas for transmitting a start signal (transmitting electric power) and transmitting and receiving other signals (radio communications at the communication frequency); however, for example, separate antennas for transmitting and receiving usual signals (radio communications at the communication frequency) maybe provided. In this case, the separate antennas may be disposed at the same positions as the antennas 22 to 25 or may be placed at other positions (for example, in the control unit 21).

The communication-possible range through the in-vehicle antennas 24 and 25 is only in the vehicle. The communication-possible range through the out-of-vehicle antennas 22 and 23 is a range a predetermined distance from the vehicle 1 outside the vehicle 1.

The coil antenna (in this case, at least the in-vehicle antenna 24, 25) is disposed in a position such that the coil antenna has an axis placed almost at right angle to a plane 1*a* parallel to the floor of the vehicle 1, as shown in FIG. 1B.

Preferably, the in-vehicle antenna 24, 25 is placed reasonably above the floor (for example, at a height of about 10 cm above the floor) to decrease the effect from the floor of the vehicle.

If the antenna is disposed in such a position, the communication-possible range through each coil antenna (area in which a start signal, etc., can be transmitted and received between the portable machine 10 and the main unit machine 20) becomes a complete range having a sufficient width along the floor direction of the vehicle 1 (normally, ground surface direction) and moreover such a good communication-possible range can be set without raising transmission output. Particularly, through the in-vehicle antenna 24, 25, the communication-possible range is widened to the corners of the vehicle thoroughly as a sufficient width, as shown in FIG. 3 or FIG. 2. That is, to place both the in-vehicle antennas 24 and 25 at the front and rear in the vehicle, as shown in FIG. 3, the communication-possible range can be set in almost all region in the vehicle without raising transmission output, and a communication-possible range distribution to the outside of the vehicle (namely, leakage of radio wave) does not exist. If only the in-vehicle antenna 24 is placed only at the front in the vehicle (in this case, between the driver's seat 43 and the passenger seat 44), as shown in FIG. 2, the communication-possible range can also be set in almost all region on the front in the vehicle without raising transmission output, and a communication-possible range distribution to the outside of the vehicle (namely, leakage of radio wave) does not exist.

Figure 9A:
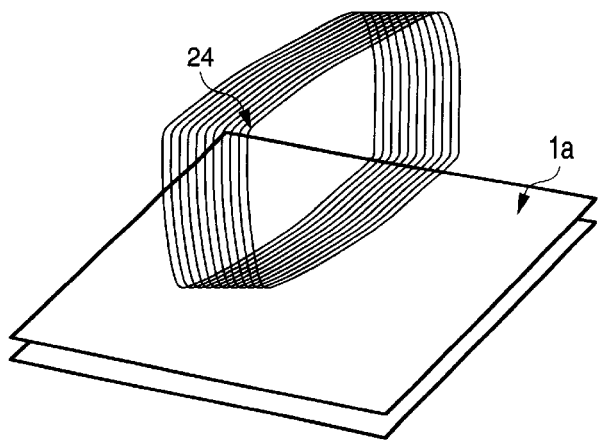
FIGS. 9A and 9B are drawings to show the composition and configuration of control examples.
Figure 9B:
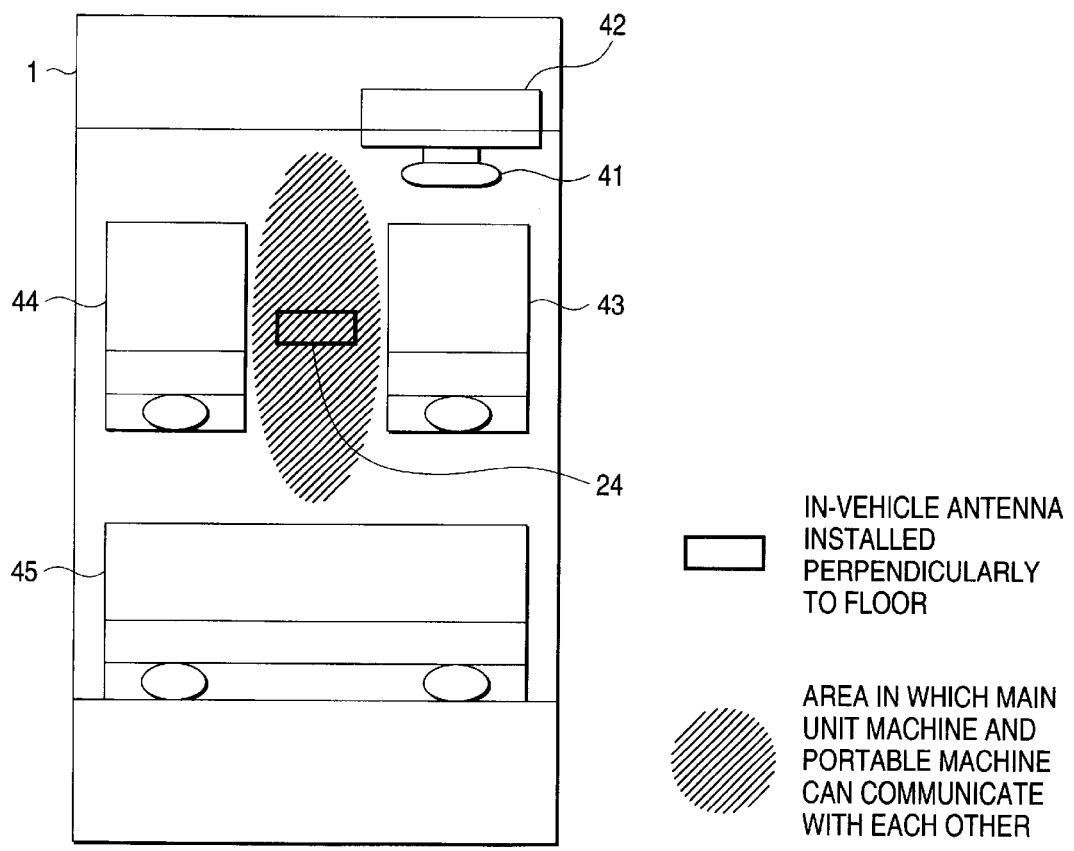

In this connection, if the in-vehicle antenna 24 is disposed in a position such that the antenna has an axis placed parallel to a plane 1*a*, as shown in FIG. 9A, in the form in which the in-vehicle antenna 24 is placed only at the front, the communication-possible range becomes extremely narrow and contains a large blind region, as shown in FIG. 9B, if other conditions (transmission output, etc.,) are the same.

Next, the door knob sensors 26 and 27 are proximity sensors each for detecting the body of the user (for example, finger) approaching the door knob of the vehicle 1 (not shown) or the vicinity of the door knob to handle the door knob.

The door lock knob switch 28 is a proximity sensor for detecting the body of the user (for example, finger) approaching a door lock knob in the vehicle (not shown) or the vicinity of the door lock knob.

The door knob sensors 26 and 27 and the door lock knob switch 28 are sensors each for forming a trigger (condition for starting power transmission as a start signal) for controlling the door unlocking operation, for example, as described later.

In the embodiment, the main unit machine 20 may be provided with a sensor for forming a trigger to control engine starting although the sensor is not shown. That is, a proximity sensor for forming a trigger to control engine starting may be disposed at one or more places where operation tools for performing drive operation in the driver's seat (containing engine start operation), such as the steering wheel 41, are placed. In the embodiment, a starter operation section (not shown) for starting the engine is a pushbutton switch or a knob switch, for example, (not a key cylinder in related art).

The control unit 21 comprises a control circuit (not shown) implemented as a microcomputer containing a CPU, ROM, and RAM, a power sending circuit (not shown) for sending electric power by power transmission, a main unit machine communication circuit (not shown) for radio-communicating a signal at the communication frequency, main unit machine storage means (not shown) for storing authentication code, a power supply circuit (not shown), and the like.

The detailed configurations of the power sending circuit, the main unit machine communication circuit, etc., are not limited in the invention and will not be discussed because at least various known configurations can be adopted. The main components are outlined. For example, the power sending circuit comprises an originating circuit for transmitting electric power through the out-of-vehicle antennas 22 and 23 and the in-vehicle antennas 24 and 25 and the like. For example, the main unit machine communication circuit comprises a circuit for radio-communicating at predetermined communication frequency (modulation circuit, demodulation circuit, originating circuit, etc.,) through the out-of-vehicle antennas 22 and 23 and the in-vehicle antennas 24 and 25 (or separate antennas described above). The control circuit comprises a CPU, ROM, RAM, and an input/output circuit. The main unit machine storage means has erasable non-volatile memory storing an authentication code, such as EEPROM.

The power supply circuit has a circuit for performing necessary voltage conversion, voltage stabilization processing, etc., with the battery installed in the vehicle 1 as an input power supply, and basically always supplies power to the power consuming components of the main unit machine 20.

In the embodiment, a signal from a door open/closed sensor (not shown) for detecting the open or closed state of a door of the vehicle 1 (in this case, at least the door of the driver's seat or the passenger seat) is also input to the control unit 21. The door open/closed sensor in the control apparatus is a sensor for forming a trigger (condition for starting power transmission as a start signal) for controlling the automatic locking operation of the door, for example, as described later.

The control circuit has functions of executing the following processing operation according to operation program setting, etc., of the microcomputer:

The control circuit has a portable machine search function of executing a portable machine search when a predetermined trigger is formed, and a control processing function of checking an authentication code for validity as required after the portable machine search and then executing predetermined control processing in response to the trigger (a specific example will be described in detail with reference to FIG. 6 and FIG. 7).

The specific processing contents of the portable machine search are, for example, as follows: Predetermined electric power as the start signal is sent by the power sending circuit for each antenna and whether or not the portable machine 10 exists in the communication-possible range through all antennas is determined based on whether or not the start notification signal is received by the main unit machine communication circuit(That is, if the start notification signal is received, it is determined that the portable machine 10 exists). At the time, which antenna the start notification signal is returned in response to the start signal sent through (or which antenna the start notification signal is received through) is determined, whereby whether or not the portable machine 10 exists in the vehicle is determined. That is, for example, if the start notification signal is received in response to the start signal sent through the in-vehicle antenna 24 or 25, the portable machine 10 is determined to exist in the vehicle.

In the processing, the portable machine search function is provided based on the reception state of the start notification signal. However, after the portable machine is started by the start signal, checking the authentication code for validity (namely, transfer of a request signal and an answer signal) described later may be performed, and where the portable machine 10 exists (in this case, whether or not the portable machine 10 exists in the communication-possible range and in the vehicle) may be determined based on whether or not the communication is established. Incidentally, in this case, the start notification signal is not necessarily required, because the determination as to whether or not the portable machine 10 is started in the main unit machine 20 need not necessarily be executed with such a response signal. For example, the main unit machine 20 may proceed to the next step (in this case, transmitting a request signal) by assuming that the portable machine 10 is started after the expiration of a predetermined time interval after sending the start signal from the main unit machine 20, for example.

The specific processing contents of checking an authentication code for validity are, for example, as follows: A request signal containing the authentication code is radio-transmitted by the main unit machine communication circuit and when an answer signal from the portable machine 10 is received by the main unit machine communication circuit after the request signal is transmitted, whether or not the authentication code contained in the answer signal corresponds to the authentication code previously registered in the main unit machine storage means is determined. If the determination result is affirmative, the authentication code from the portable machine 10 is determined valid.

As previously mentioned in the description of the portable machine 10, the authentication code may be contained in the request signal and may be checked for validity in the portable machine 10 before the answer signal is transmitted. In doing so, the following inconvenience for crime prevention or power saving can be circumvented: For example, in a situation in which a plurality of vehicles each comprising the same model of entry system are placed nearby, whenever the portable machine 10 is started by a start signal from the main unit machine 20 of a vehicle different from the vehicle of the user of the portable machine 10, it transmits an answer signal containing the authentication code.

As the control functions of the main unit machine 20, for example, the following function may be provided in addition to the functions as described above:

After a predetermined trigger is once formed, the main unit machine 20 transmits a start signal periodically even if the trigger does not continuously occur, and whether or not a start notification signal is received is checked (or a request signal and an answer signal are transferred and received or the authentication code is checked for validity based on transferring and receiving the request signal and the answer signal). Whether or not the portable machine 10 exists within the communication-possible range is determined periodically based on whether or not the communication is established (or the authentication code is determined valid). For example, when the portable machine 10 is determined to be outside the communication-possible range involved in all antennas, the monitor processing is terminated. This function will be hereinafter referred to as continuous portable machine search function. If the function is provided, preferably the monitor processing is executed for each antenna.

Figure 4A:
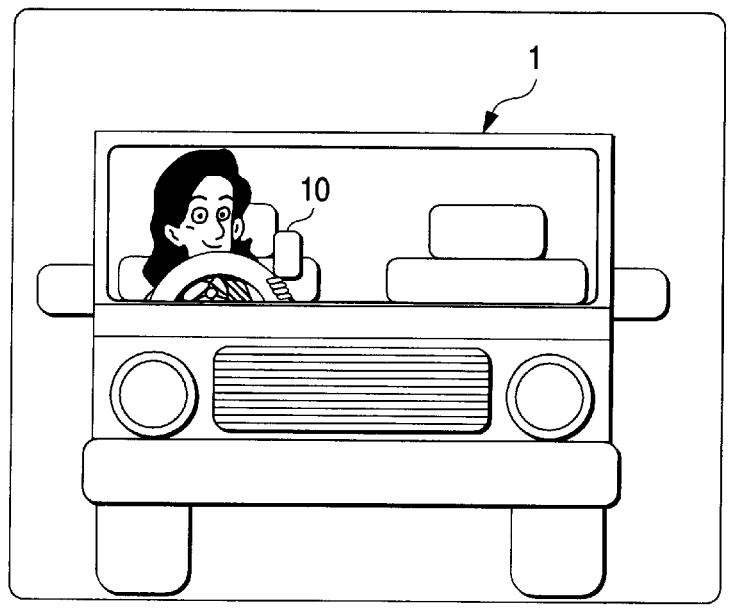
FIGS. 4A and 4B are drawings to show one example of an automatic locking function of the control apparatus.
Figure 4B:
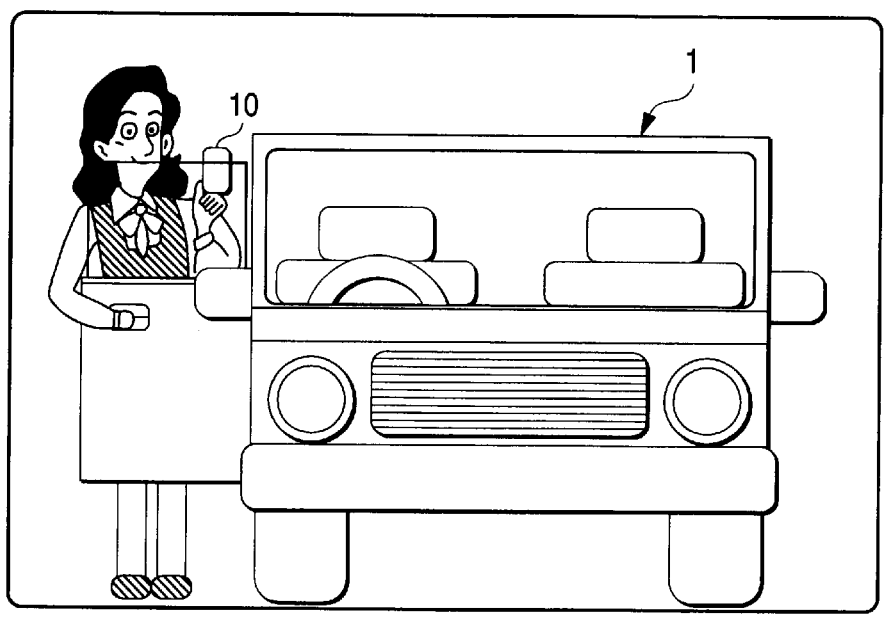
Figure 5A:
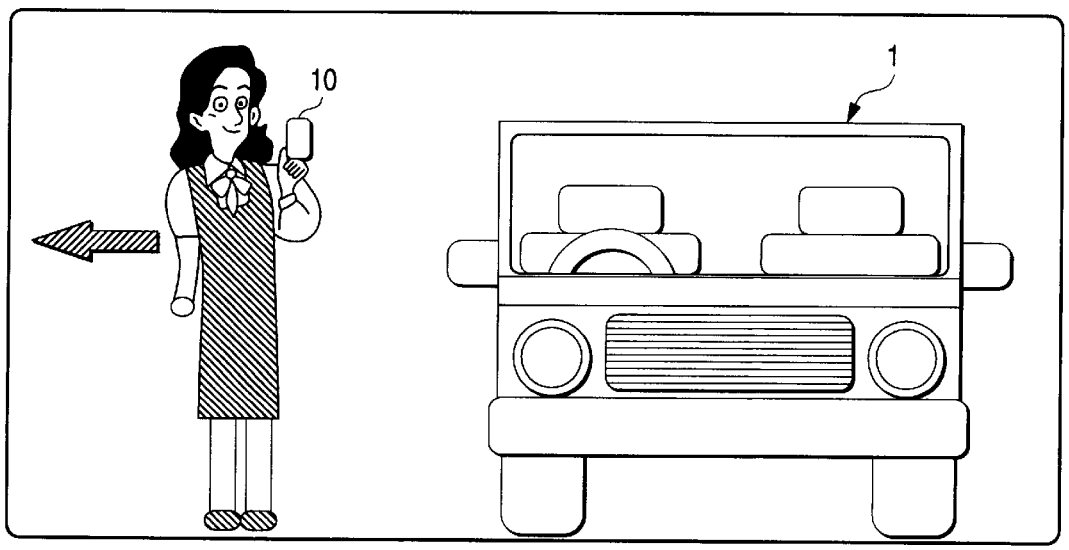
FIGS. 5A and 5B are drawings continued from FIGS. 4A and 4B.
Figure 5B:
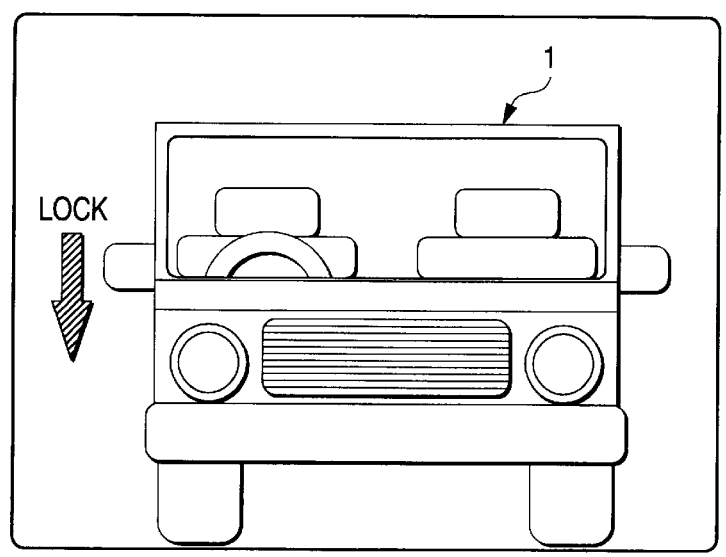

In the configuration, the continuous portable machine search function makes it possible to continuously determine (at least estimate) whether the portable machine (or the driver normally carrying the portable machine) exists in or out of the vehicle or exists at the right or left of the outside of the vehicle 1. Thus, for example, if the driver in the vehicle 1 as shown in FIG. 4A gets off the vehicle and closes a door as shown in FIG. 4B and leaves the vehicle 1 as shown in FIG. 5A and is away from the communication-possible range through the out-of-vehicle antennas 22 and 23 as shown in FIG. 5B, the operation sequence can be determined by the continuous portable machine search function and if the doors are not unlocked, a control signal can be output to the door lock actuator 31 for automatically locking the doors. This operation is one form of the locking operation of the smart entry system.

As another control function of the main unit machine 20, the following function may be provided: For example, the fact that the engine of the vehicle 1 is stopped is sensed based on a notification signal from the control unit 32 of the engine control system, a steering lock actuation signal is transmitted to the steering lock 33 for automatically placing the steering wheel 41 in a steering lock state (that is, the steering wheel 41 is set to be unrotatable).

The main unit machine 20 may also have the following function: When a switch placed on the portable machine 10, such as a locking or unlocking switch is operated as previously mentioned in the description of the portable machine 10, upon reception of a radio signal transmitted from the portable machine 10, such as a locking command signal containing the authentication code, the authentication code is checked for validity, then a control signal for accomplishing the operation responsive to the command contained in the radio signal, such as the operation of locking the doors of the vehicle 1, is output. This function is the same as a general one-way communication keyless entry system.

Next, a characteristic operation example of the control apparatus will be discussed together with the control processing contents of the portable machine 10 and the main unit machine 20 involved in the operation example.

Figure 6:
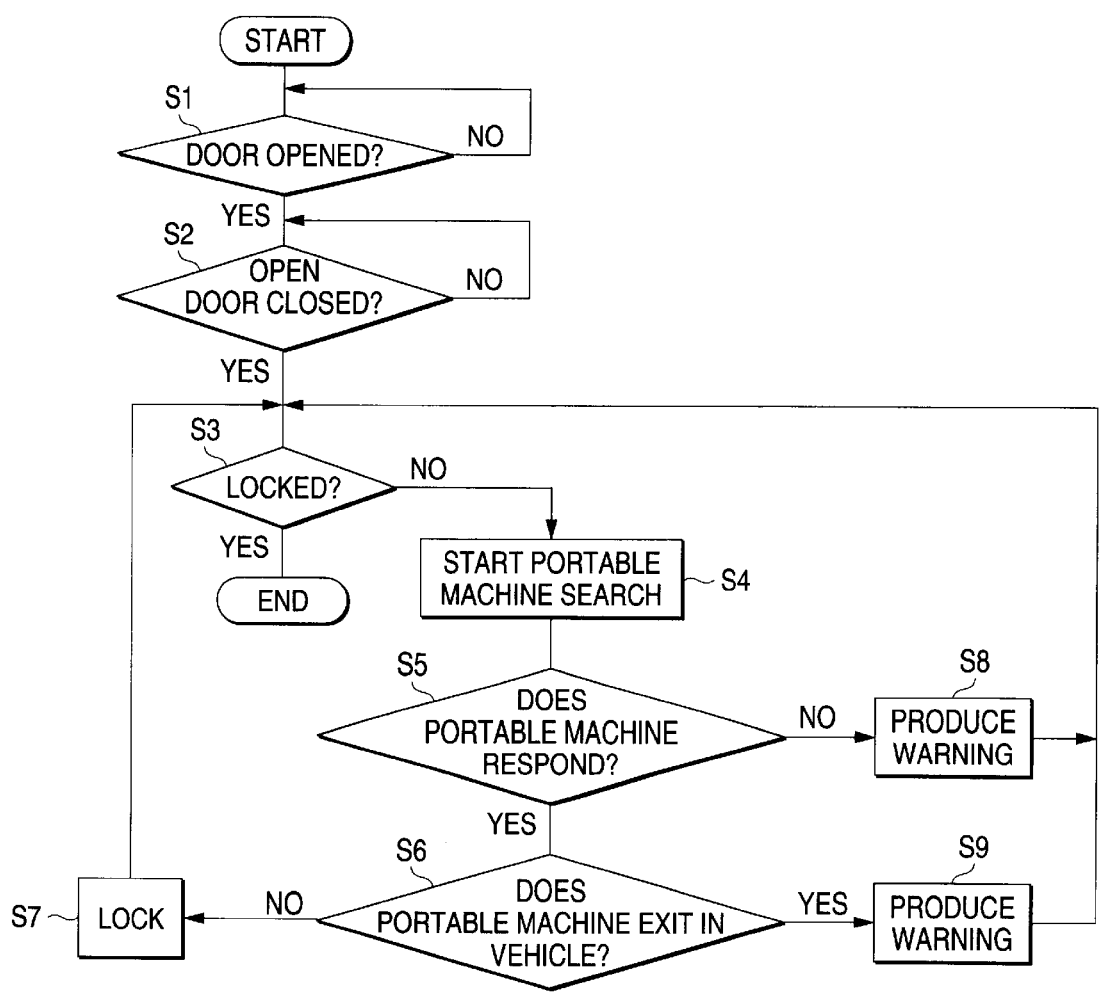
FIG. 6 is a flowchart to describe the automatic locking operation of the control apparatus.

First, FIG. 6 is a flowchart to show a flow of one form of the automatic locking operation of the control apparatus (one example of the automatic locking function as the smart entry system).

First, at steps S1 to S3, whether or not a predetermined trigger (namely, start condition) holds is determined by processing of the main unit machine 20 (precisely, processing of the control circuit of the control unit 21). That is, if it is determined based on an output signal of the door open/closed sensor that a vehicle door, which may be any door or may be limited to the driver's seat door, for example, is opened (step S1) and then the door is determined to be closed, for example, after the expiration of a predetermined time interval (step S2) and further it is determined that the door (or any of other doors, for example) is not locked, it is assumed that the predetermined trigger holds and control goes to step S4. If the predetermined trigger does not hold, the subsequent operation is not performed.

The contents of the trigger are not limited to the above-described form. For example, if the continuous portable machine search function of periodically searching for the presence location of the portable machine 10 as described above is provided, the fact that it is determined that the portable machine 10 is moved from the vehicle inside to the outside (namely, it is estimated that the passenger of the driver, etc., leaves the vehicle) by the continuous portable machine search function and that a predetermined door (or any door), for example, where the portable machine 10 is moved is closed may be adopted as the trigger contents. Alternatively, if it is determined based on output of the door open/closed sensor that the open door is closed in a state in which the door knob sensor 26, 27 outputs a detection signal (namely, it is estimated that the passenger of the driver, etc., closes the door with the door knob), it can also be determined that the trigger holds.

Next, at step S4, the portable machine search function is executed. That is, for example, the main unit machine 20 transmits a start signal and determines which antenna a start notification signal as a response from the portable machine 10 is received through. If no response from the portable machine 10 is received through the antennas as the result of the portable machine search, control goes to step S8 through step 5, and a warning informing the user of an anomaly is produced under the control of the main unit machine 20, for example, by turning on or blinking a lamp, such as a head lamp or a hazard lamp, outputting a warning sound (for example, sounding a horn), or the like. Control goes to step S8 if the door is opened/closed and moreover any door is not locked although the portable machine 10 is beyond the communication-possible range through every antenna. Therefore, there is a possibility of forgetting about locking the doors or illegal opening/closing the doors, and the administrator of the vehicle 1 carrying the portable machine 10 at a distance position from the vehicle 1 (normally, the vehicle 1 owner or driver), for example, should also be warned of the abnormal condition of crime prevention in a notification-possible form as much as possible.

If it is determined that the portable machine 10 exists in the vehicle as the result of the portable machine search at step S4, control goes to step S9 through step S6 and a warning informing the user of an anomaly is also produced under the control of the main unit machine 20. Control goes to step S9 if it is feared that the portable machine 10 may be locked into the vehicle. Thus, the passenger getting off the vehicle should be warned of the fact in a well informable form (for example, by producing a buzzer sound).

If it is determined that the portable machine 10 exists in the communication-possible range outside the vehicle as the result of the portable machine search at step S4, it is estimated that the user of the portable machine 10 gets off the vehicle normally. Then, at step S7, the main unit machine 20 produces control output for automatically locking the unlocked door, which may be any door or may be limited only to the driver's seat door, for example. Through step S7, control returns to step S3 and, for example, if any door is not yet locked, the operation at step S4 and the later steps is again performed.

On the other hand, if control goes to step S8 or S9, control also returns to step S3 after a warning is produced. Thus, again step S8 or S9 is repeated for continuing the warning until the door is locked unless the situation changes.

According to the operation of the control apparatus described above, for example, if the driver carrying the portable machine 10 in which the right authentication code is registered simply opens and closes a door, the operation at step S7 is executed for automatically locking at least the door; the automatic locking operation as the so-called smart entry system can be realized.

The automatic locking operation of the control apparatus is not limited to the form previously described with reference to FIG. 6. For example, if the main unit machine 20 is provided with the continuous portable machine search function of periodically searching for the presence location of the portable machine 10 as described above, when it is determined that the portable machine 10 is moved from the vehicle inside to the outside (namely, it is estimated that the passenger of the driver, etc., leaves the vehicle) by the continuous portable machine search function, the main unit machine 20 again checks that the portable machine 10 does not exist in the vehicle as required, then if any of the closed doors is unlocked, the main unit machine 20 produces control output for locking the door, whereby the automatic locking operation can also be realized.

Alternatively, when it is determined that the portable machine 10 is moved from the vehicle inside to the outside and further is placed beyond the communication-possible range through the out-of-vehicle antenna 22, 23 (namely, it is estimated that the passenger of the driver, etc., leaves the vehicle and is away from the vehicle 1 at a predetermined distance) by the continuous portable machine search function as described above, the main unit machine 20 again checks that the portable machine 10 does not exist in the vehicle as required, then if any of the closed doors is unlocked, the main unit machine 20 produces control output for locking the door, whereby the automatic locking operation can also be realized. Incidentally, in this case, as shown in FIG. 4 and FIG. 5, the automatic locking operation is executed only if the passenger carrying the portable machine gets off the vehicle 1 and further is away from the vehicle 1 at the predetermined distance, so that the inconvenience of automatically locking the door whenever the passenger temporarily gets off the vehicle 1 near the vehicle 1 and closes the door can be eliminated.

The following is possible as a specific example of the automatic unlocking operation performed by the control apparatus (an example of the automatic locking function as the smart entry system):

The automatic unlocking operation can be performed after the portable machine search is executed and the authentication code is checked for validity, for example, with output of a detection signal of the door knob sensor 26 or 27 or the door lock knob switch 28 (with the corresponding door locked) as a trigger. That is, if a detection signal of the door knob sensor 26 or 27 or the door lock knob switch 28 is output with the door locked, it is estimated that the driver or the passenger touches the door knob or the door lock knob attempting to open the door (or attempting to unlock the door). Thus, if the main unit machine 20 determines it, the main unit machine 20 executes the portable machine search and if the portable machine 10 is found in the communication-possible range, the main unit machine 20 further checks the authentication code for validity. If the portable machine 10 has the valid registered authentication code, the main unit machine 20 executes control output for unlocking the door. According to the configuration, if the user (driver or passenger) carrying the portable machine 10 simply performs the natural operation of touching the door knob, etc., of the vehicle 1 and opening the door, the door is automatically unlocked and the automatic unlocking operation of the so-called smart entry system can be realized.

Figure 7:
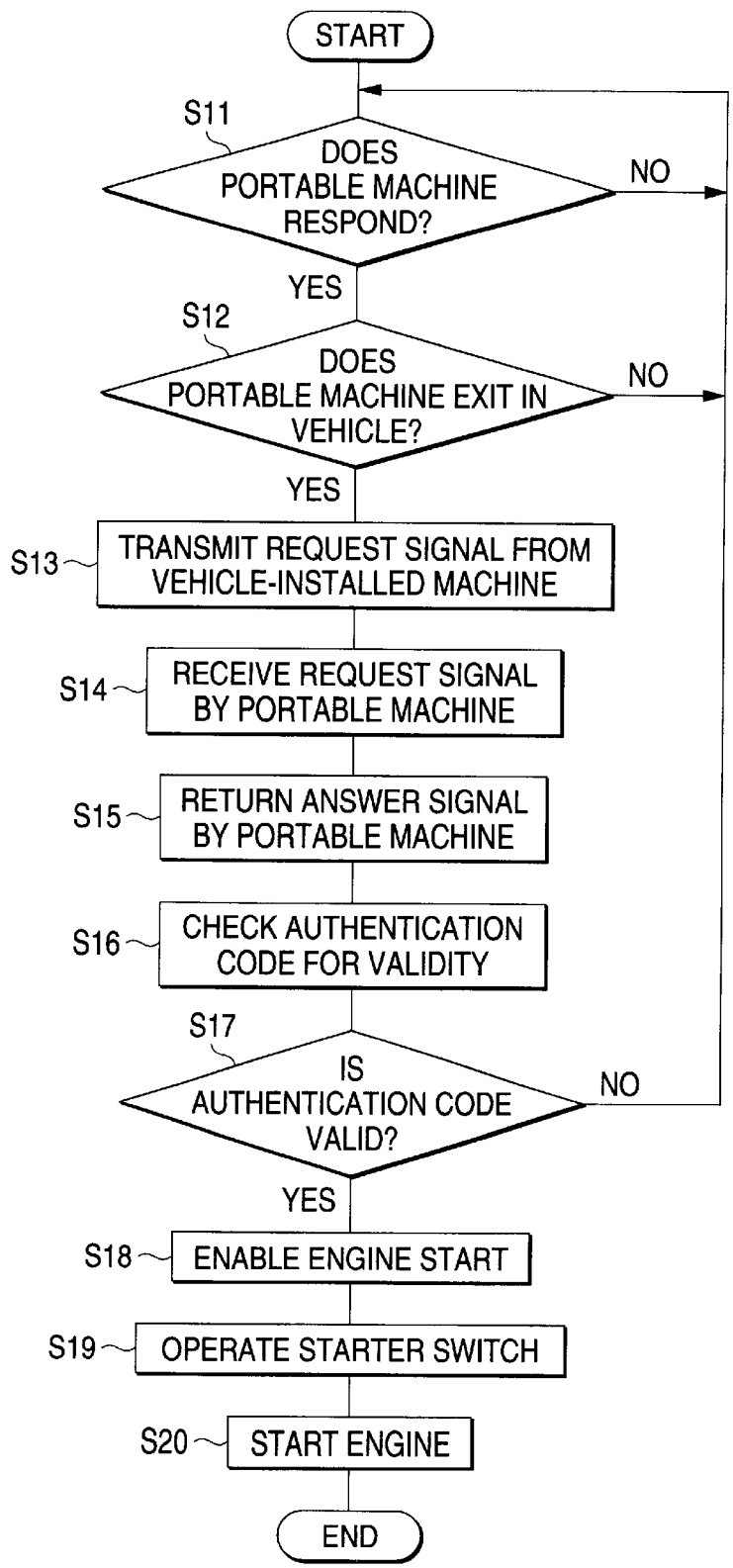
FIG. 7 is a flowchart to describe the engine start operation of the control apparatus.

Next, FIG. 7 is a flowchart to show a flow of the engine start operation of the control apparatus.

In this case, preferably the operation shown in FIG. 7 is executed only if a predetermined trigger for engine start control (for example, output of a detection signal by the proximity sensor of the driver's seat described above) holds. In doing so, a start signal for a portable machine search is not always transmitted (for example, a start signal is transmitted only if the driver sits in the driver's seat and performs drive operation), so that power consumption of the main unit machine 20 can be saved. However, if such power consumption does not introduce a problem, a start signal may be periodically transmitted all the time for periodically executing a portable machine search, etc., (in this case, processing at step S11 and the later steps described later).

First, at steps S11 and S12, the above-described portable machine search function is executed. That is, for example, the main unit machine 20 transmits a start signal and determines which antenna a start notification signal as a response from the portable machine 10 is received through. If no response from the portable machine 10 is received or if it is determined that the portable machine 10 does not exist in the vehicle as the result of the portable machine search, control returns to the beginning and the operation is repeated. However, if the start condition is that the above-described trigger should hold, the-system waits until another trigger holds.

Next, at steps S13 to S17, the authentication code check operation for validity described above is executed. That is, the main unit machine 20 (vehicle-installed machine) transmits a request signal at step S13, the portable machine 10 receives the request signal at step S14 and returns an answer signal at step S15, and the main unit machine 20 (vehicle-installed machine) checks the authentication code for validity based on the answer signal at step S16. If the determination result is affirmative, control goes through step S17 to step S18; if the determination result is negative, the authentication code is determined invalid and control returns to the beginning and the operation is repeated. However, if the start condition is that the above-described trigger should hold, the system waits until another trigger holds.

At step S18, the main unit machine 20 performs signal output or data setting operation (for example, sets an engine start enable flag) for enabling engine start of the vehicle 1 and further outputs a steering unlocking command to the steering lock 33. If engine start is enabled in such a manner, starter operation (operation of the starter operation section) shown at step S19 becomes effective and the engine is actually started as shown at step S20 as the starter operation section is operated. When the steering unlocking command is output, the steering lock is released and the steering lock 33 is operated, enabling the driver to handle the steering wheel 41.

According to the described operation, if the driver carrying the portable machine simply sits in the driver's seat (however, if the above-described trigger is set, the drive operation to actuate the proximity sensor is required), engine start is enabled, the engine can be started by easy operation of pushing the pushbutton starter operation section, for example, as described above, and further steering lock is automatically released for enabling the driver to handle the steering wheel 41 and immediately run the vehicle. Moreover, engine start is not enabled and steering lock is not released for any person who does not carry the portable machine; if the person operates the starter operation section, the engine is not started and the steering wheel 41 remains locked, so that the vehicle can be protected from theft. Therefore, the engine start control system involving authentication code check for validity enabling advanced crime prevention as compared with the conventional lock and key system is provided and the highly convenient operation as with the smart entry system (namely, eliminating the need for the user to perform any intentional operation for enabling engine start, etc.,) is realized.

As the control processing performed by the main unit machine 20 if a search is made for the portable machine 10 and the authentication code is determined valid, the processing of enabling engine start, etc., (step S18) has been described in the operation example, but the invention is not limited to it. For example, it may be control processing of immediately starting the engine, namely, steps S18 and S19 in FIG. 7 may be omitted. However, considering safety, it is desirable that the driver should surely intend to start the engine. Thus, from this viewpoint, the configuration previously described with reference to FIG. 7 is preferred.

In the flowchart of FIG. 7, the operation executed if starter operation is not performed although engine start is enabled and steering lock is released is not shown; preferably, engine start enabling, etc., is canceled from the point of crime prevention, for example, if the starter operation is not performed after the expiration of a given time interval. To prevent engine start enabling, etc., from being held unnecessarily, for example, when the authentication code is determined invalid at step S17, engine start enabling, etc., at step S18 in the operation sequence in the immediately preceding cycle may be canceled in processing of the main unit machine 20 before the operation is returned to the beginning, namely, step S11.

The control apparatus of the embodiment described above can provide the following excellent practical advantages:

Since the radio communication antennas 22 to 25 of the main machine unit 20 (antennas for at least transmitting a start signal) are shaped like coils and are placed so that the axial direction of each antenna becomes at right angle to the floor of the vehicle 1, the communication-possible range (particularly, the transmission/reception-possible range of a start signal) can be set to an exceptionally wide, proper range (less leakage as a whole) without increasing the number of antennas or the transmission output.

Thus, the possibility of occurrence of the problem wherein although the user carrying the valid portable machine 10 lies in the same degree of the distance range from the vehicle 10 (or exists in the vehicle), radio communications become impossible and the predetermined control processing (door locking or unlocking operation, engine start enabling, etc., as described above) is not executed depending on the position of the portable machine 10 (user) (particularly, position in the floor direction of the vehicle 1) can be decreased. Namely, the operation reliability can be enhanced without increasing power consumption or costs or involving the detrimental effects caused by unnecessary enlarging of the communication-possible range (the fear of having the authentication code contained in a radio signal stolen because the communication-possible range is unnecessarily spread or the like).

That is, with the communication-type control apparatus as described in the various specific examples (particularly, the apparatus for performing advanced control processing based on the portable machine search as described above), if the communication-possible range (particularly, the transmission/reception-possible range of a start signal at low frequency) is not set to a predetermined range thoroughly with good accuracy, the reliability and precision of the control operation are degraded, of course. Thus, for example, there is a fear of occurrence of the following problem: The smart entry system function cannot much be used actually although it is provided. However, if the antennas configured as in the invention are placed as the main unit machine antennas of such a communication-type control apparatus including the smart entry system, the communication-possible range can be exceptionally well spread. Thus, the reliability of a control apparatus of a system such as a general keyless entry system in the related art (one-way communication type) can be enhanced and further the reliability of a control apparatus of an advanced system such as a smart entry system (two-way communication type) can be made to reach a sufficiently practical level and the most of the high convenience of such an advanced control apparatus can be made effectively.

Particularly, in the control apparatus of the invention, one or more in-vehicle antennas 22, 23 (in-vehicle communication antennas) for radio-communicating with the portable machine 10 in the vehicle are placed near the center in the floor direction in the vehicle (in this case, one or two antennas) as the radio communication antennas of the main unit machine 20.

Such a structure makes it possible to set the communication-possible range with the portable machine 10 in the vehicle to a wide range containing the corners in the vehicle (shown in FIG. 2 and FIG. 3) while reducing transmission output to a minimum, and moreover the number of in-vehicle antennas for the purpose is needed to be only a few.

Thus, it is made possible to enhance the reliability of the control operation based on radio communications made effective particularly with the portable machine 10 in the vehicle (for example, the control operation requiring a determination as to whether or not the portable machine 10 exists in the vehicle or the control operation of manual remote operation of operating the switch of the portable machine 10 existing in the vehicle as previously described with reference to FIG. 6 or FIG. 7) without increasing power consumption, costs, etc.

(Other Embodiments)

The invention is not limited to the above-described embodiment and various modifications are possible. For example, in the above-described embodiment, the specific examples are given only for control of locking and unlocking the doors and engine start control, but the invention is not limited to them, and various controlled targets and the various control contents are possible.

The portable machine 10 may be provided with additional switches and various types of remote operation (manual operation) may be made possible in response to the additional switches. For example, switches for remotely operating opening and closing a trunk, an engine room, a refueling inlet, etc., a panic switch for sounding the vehicle's horn when the passenger is assaulted by a thug, etc., and the like may be provided as required, needless to say.

To transmit and receive a signal at the normal communication frequency between the portable machine and the main unit machine, other signals than the above-described signals (request signal, answer signal, and start notification signal) may be transmitted and received.

The invention can be widely applied to any apparatus other than the vehicle entry system, etc., if the apparatus performs some control based on radio communications between a portable machine and a main unit machine. Further, for example, a trailer house, a building (for example, plant control room), or the like comprising a cabin (living space) having a given floor is possible as an equivalent to "vehicle" of the invention, and a machine, an apparatus, etc., installed inside or outside a building is possible as an equivalent to "object installed in vehicle" of the invention.

(Verification Test)

Figure 8:
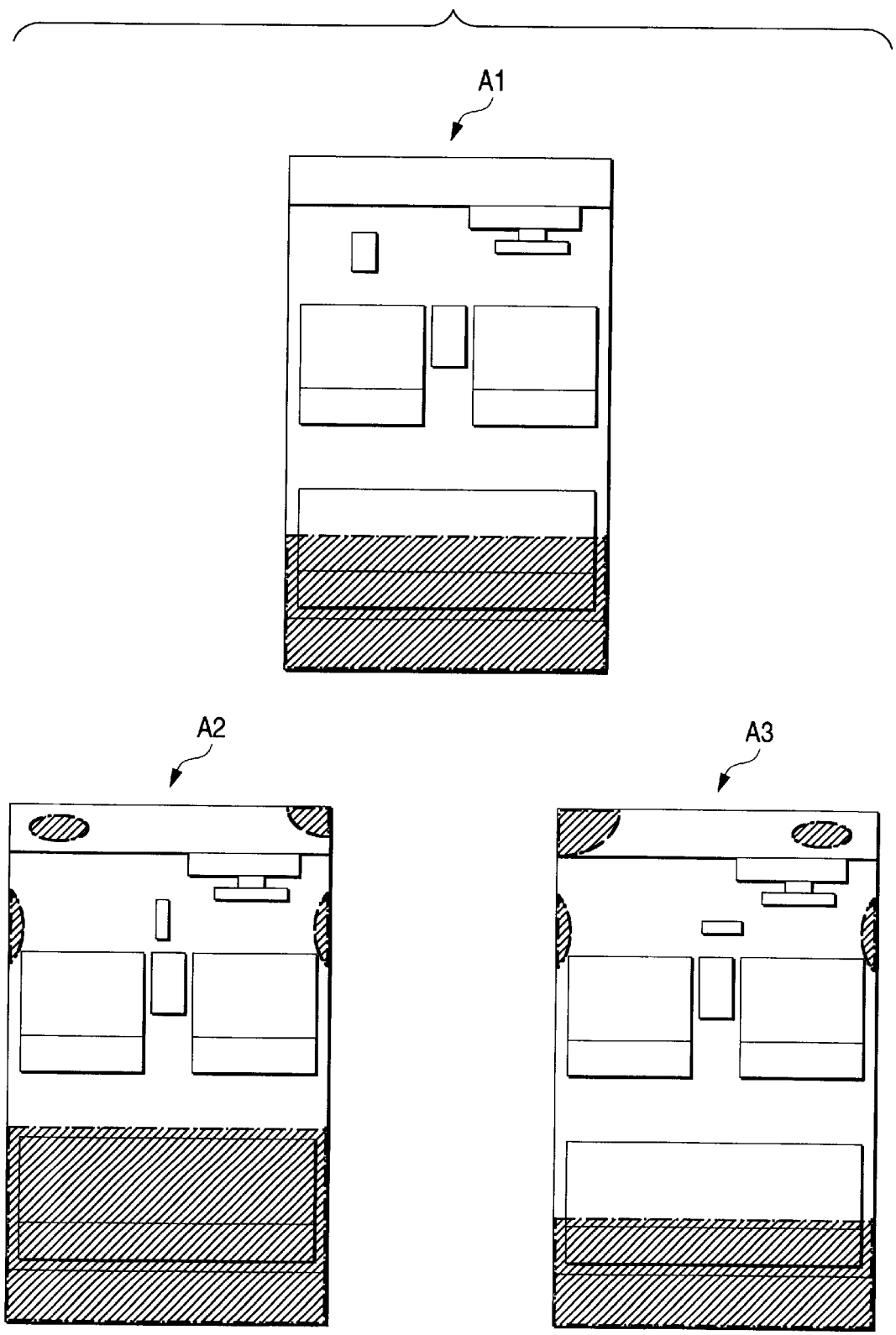
FIG. 8 is a drawing to show the results of a communication test of examples of the invention.
Figure 10:
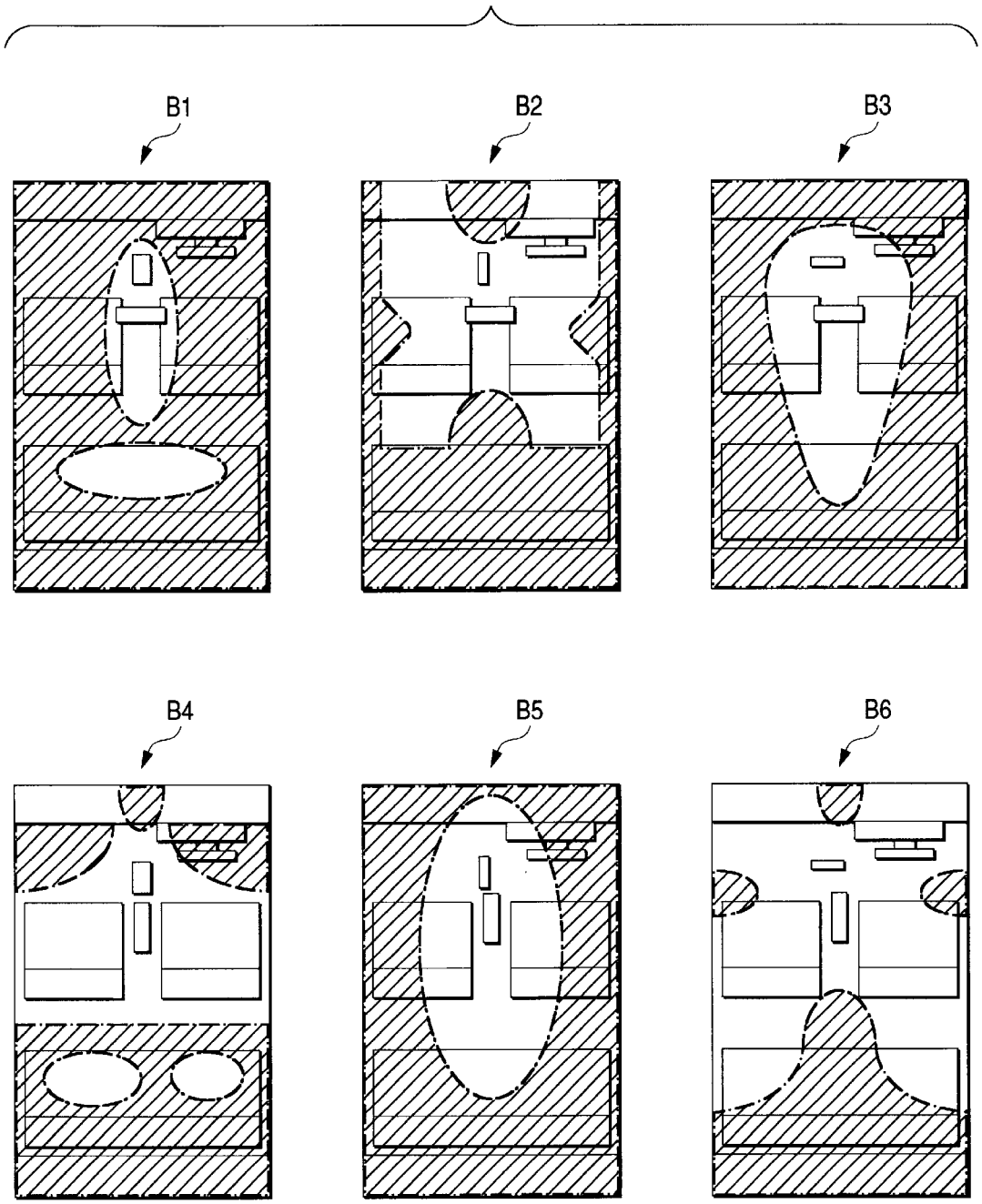
FIG. 10 is a drawing to show the results of a communication test of the control examples.

FIG. 8 and FIG. 10 are drawings to show the results of test conducted by the inventor et. al to verify the functions and advantages of the invention. The plan views of a vehicle in FIGS. 8 and 10 are almost the same as the plan views of the vehicle in FIG. 2 and FIG. 3 and the configuration will not be discussed again.

In the test, an in-vehicle antenna (coil antenna) of a main unit machine was placed at the same position as the above-described in-vehicle antenna 24 in FIG. 2. In this state, while a portable machine was moved from one position to another in the floor direction in the vehicle, a check was made to see if the portable machine can receive a signal transmitted through the in-vehicle antenna.

The transmission/reception frequency was 130 kHz assuming a start signal and transmission output was set to a constant value such that vehicle windows become boundaries of the communication-possible range (namely, a constant value such that a radio wave does not leak to the outside of the vehicle). The placement position of the in-vehicle antenna in the height direction thereof was set about 10 cm above the vehicle floor (metal body portion). A check was made to see if the portable machine containing a portable machine antenna can receive a signal in a state in which it was placed on the floor, a seat, a panel, etc., at floor direction positions.

In FIG. 8 and FIG. 10, reception-impossible portions are shaded and surrounded by alternate long and short dash lines on the plan views of the vehicle. Test data A1 to test data A3 shown in FIG. 8 are provided as examples of the invention by placing the in-vehicle antenna in a horizontal position (the center axis of the coil becomes at right angle to the floor) as shown in FIG. 1B. The test data A1 is provided by also placing the antenna of the portable machine in a horizontal position. The test data A2 is provided by placing the antenna of the portable machine in an upright position (the center axis of the coil becomes parallel to the floor) with the length direction of the antenna matching the length direction of the vehicle. The test data A3 is provided by placing the antenna of the portable machine in an upright position with the length direction of the antenna matching the width direction of the vehicle.

Test data B1 to test data B6 shown in FIG. 10 are provided as control examples by placing the in-vehicle antenna in an upright state (the center axis of the coil becomes parallel to the floor) as shown in FIG. 9A. The test data B1 to the test data B3 are provided by placing the in-vehicle antenna with the length direction thereof matching the width direction of the vehicle. The test data B4 to the test data B6 are provided by placing the in-vehicle antenna with the length direction thereof matching the length direction of the vehicle. The test data B1 and the test data B4 are provided by placing the antenna of the portable machine in a horizontal position. The test data B2 and the test data B5 are provided by placing the antenna of the portable machine in an upright position with the length direction of the antenna matching the length direction of the vehicle. The test data B3 and B6 are provided by placing the antenna of the portable machine in an upright position with the length direction of the antenna matching the width direction of the vehicle.

The vehicle, the main machine unit, the portable machine, and other conditions used with the test are the same as for all test data.

It is seen from the test data in FIG. 10 as the control examples that a reception-impossible blind region exists in many parts in the vehicle. Even in the test data B2 or B6 with a comparatively small number of blind regions, the blind regions exist in the area near to the driver's seat and a part of the driver's seat important for the control apparatus. Therefore, in the configuration of the control examples (wherein the coil antenna is disposed in an upright state on the floor), the operation reliability and precision of various types of control processing performed based on the determination as to whether or not the portable machine exists in the vehicle as described above, for example, are considerably degraded, and it is made almost impossible to put the configuration to use particularly under the condition indicated in the test data B1 (or a large number of in-vehicle antennas must be installed, leading to a drastic increase in costs). FIG. 9B is a drawing prepared based on the test data B1.

In contrast, it is seen from the test data in FIG. 8 as the examples of the invention that a blind region does not exist or scarcely exists except for the rear seat (or a part thereof) or the trunk room comparatively less important for the control apparatus. Even in the test data A2 or A3 with slight blind regions also existing in the front seat sides, a blind region does not exist on the driver's seat important for the control apparatus and a blind region scarcely exists in a part near to the driver's seat. FIG. 2 is a drawing prepared based on the test data A1 in FIG. 8.

Therefore, in the configuration of the examples (wherein the coil antenna is disposed in a parallel state with the floor), the operation reliability and precision of various types of control processing performed based on the determination as to whether or not the portable machine exists in the vehicle as described above, for example, are exceptionally enhanced, and the configuration can be put to use simply by installing one in-vehicle antenna. If another in-vehicle antenna is installed in the rear in a similar position, as shown in FIG. 3, a good communication-possible area spread to the corners of the whole vehicle with almost no leakage (namely, blind regions do not exist) can be set in the vehicle and moreover a radio wave does not leak to the outside of the vehicle.

The test results also indicate that similar advantages can be provided if the concept of the invention is applied to an out-of-vehicle antenna placed in a door mirror, etc., because in the examples (FIG. 8), each communication-possible range is well spread as a clearly wide form with almost no distortion or hollow regardless of the same transmission output as in the control examples (FIG. 10).

According to the control apparatus of the invention, it is made possible to set the communication-possible range to an exceptionally wide, proper range (less leakage as a whole) although the number of antennas, the antenna placement position, or the transmission output is the same as verified from the test results described above.

Thus, the possibility of occurrence of the problem wherein although the user carrying the portable machine lies in the same degree of the distance range from the vehicle (or exists in the vehicle), radio communications become impossible and the predetermined control processing is not executed depending on the position of the portable machine (particularly, position in the floor direction of the vehicle) can be decreased, namely, the operation reliability can be enhanced without increasing power consumption or costs or involving the detrimental effects caused by unnecessary enlarging of the communication-possible range (the fear of having the authentication code contained in a radio signal stolen because the communication-possible range is unnecessarily spread or the like).

What is claimed is:

1. A control apparatus comprising:
    a portable machine; and
    a main unit machine disposed on a vehicle and having at least one coil shaped radio communication antenna which is disposed such that an axial direction of the antenna intersects at a right angle to a floor of the vehicle, said at least one coil shaped radio communication antenna disposed on the floor of the vehicle such that substantially all of an area of a front half of the vehicle is covered as a signal reception area, said main unit machine conducting radio communications with said portable machine and executing control processing for accomplishing a predetermined operation of an object installed in the vehicle in response to a result of the radio communications conducted with said portable machine, wherein the radio communication antenna is at least one in-vehicle communication antenna for conducting the radio communications with said portable machine which exists in the vehicle, the in-vehicle communication antenna placed near a center of the floor of the vehicle.

2. The control apparatus as claimed in claim 1, wherein the in-vehicle communication antenna is placed only at a front in the vehicle.

3. The control apparatus as claimed in claim 1, wherein the object installed in the vehicle is a lock device for locking or unlocking a door of the vehicle, and the control processing is control signal output for accomplishing the locking or unlocking operation of the lock device.

4. The control apparatus as claimed in claim 1, wherein said main unit machine is provided with a search portable machine function for determining where said portable machine exists on the basis of an establishment of the radio communications with said portable machine.

5. The control apparatus as claimed in claim 3, wherein said main unit machine is provided with a search portable machine function for determining where said portable machine exists on the basis of an establishment of the radio communications with said portable machine.

6. The control apparatus as claimed in claim 5, wherein the radio communication antenna has at least one in-vehicle communication antenna for conducting the radio communications with said portable machine which exists in the vehicle, and said main unit machine determines, by the portable machine search function, at least that said portable machine exists inside or outside the vehicle on the basis of the establishment of the radio communications with said portable machine through the in-vehicle communication antenna, wherein said main unit machine executes the control signal output for accomplishing the locking operation of the lock only if it is determined by the portable machine search function that said portable machine does not exist in the vehicle.

7. The control apparatus as claimed in claim 5, wherein the radio communication antenna has at least one out-of-vehicle antenna for conducting the radio communications with said portable machine which exists outside the vehicle, and said main unit machine determines, by the portable machine search function, at least whether or not said portable machine is away from the vehicle exceeding a communication-possible range of the out-of-vehicle radio communication antenna on the basis of the establishment of the radio communications with said portable machine through the out-of-vehicle radio communication antenna, wherein said main unit machine executes the control signal output for accomplishing the locking operation of the lock on the basis of the check of the predetermined condition if said main unit machine determines, by the portable machine search function, that said portable machine is away from the vehicle exceeding the communication-possible range.

8. The control apparatus as claimed in claim 1, wherein the control processing is one of a signal output or data setting operation for enabling the operation of the object installed in the vehicle and signal output for giving an instruction to operate the object installed in the vehicle.

9. The control apparatus as claimed in claim 8, wherein the radio communication antenna has at least one in-vehicle communication antenna for conducting the radio communications with said portable machine which exists in the vehicle, and said main unit machine is provided with a search portable machine function for determining at least that said portable machine exists inside or outside the vehicle on the basis of the establishment of the radio communications with said portable machine through the in-vehicle communication antenna, wherein said main unit machine executes one of the signal output or data setting operation for enabling the operation of the object installed in the vehicle and the signal output for giving an instruction to operate the object installed in the vehicle only if the main unit machine determines, by the portable machine search function, that said portable machine exists in the vehicle.

10. The control apparatus as claimed in claim 1, wherein the at least one coil shaped radio communication antenna comprises two coil shaped radio communication antennas that cover substantially all of an area of the vehicle as a signal reception area.

* * * * *